Jan. 11, 1944.   P. J. DUGAN   2,339,005
FLUID SUPPLY CONTROL
Filed May 21, 1941   2 Sheets-Sheet 1

INVENTOR.
PETER J. DUGAN
BY
Gifford, Scull & Burgess
ATTORNEYS

Jan. 11, 1944.   P. J. DUGAN   2,339,005

FLUID SUPPLY CONTROL

Filed May 21, 1941   2 Sheets-Sheet 2

INVENTOR.
PETER J. DUGAN
BY *Gifford, Snell & Burgess*
ATTORNEYS

Patented Jan. 11, 1944

2,339,005

UNITED STATES PATENT OFFICE 2,339,005

FLUID SUPPLY CONTROL

Peter J. Dugan, Crestwood, N. Y.

Application May 21, 1941, Serial No. 394,493

8 Claims. (Cl. 172—239)

My invention relates to a method and apparatus for controlling the supply of a fluid under pressure and more particularly to controlling the rate at which a fluid under pressure is delivered to a distribution system at a reduced pressure.

Figure 1:
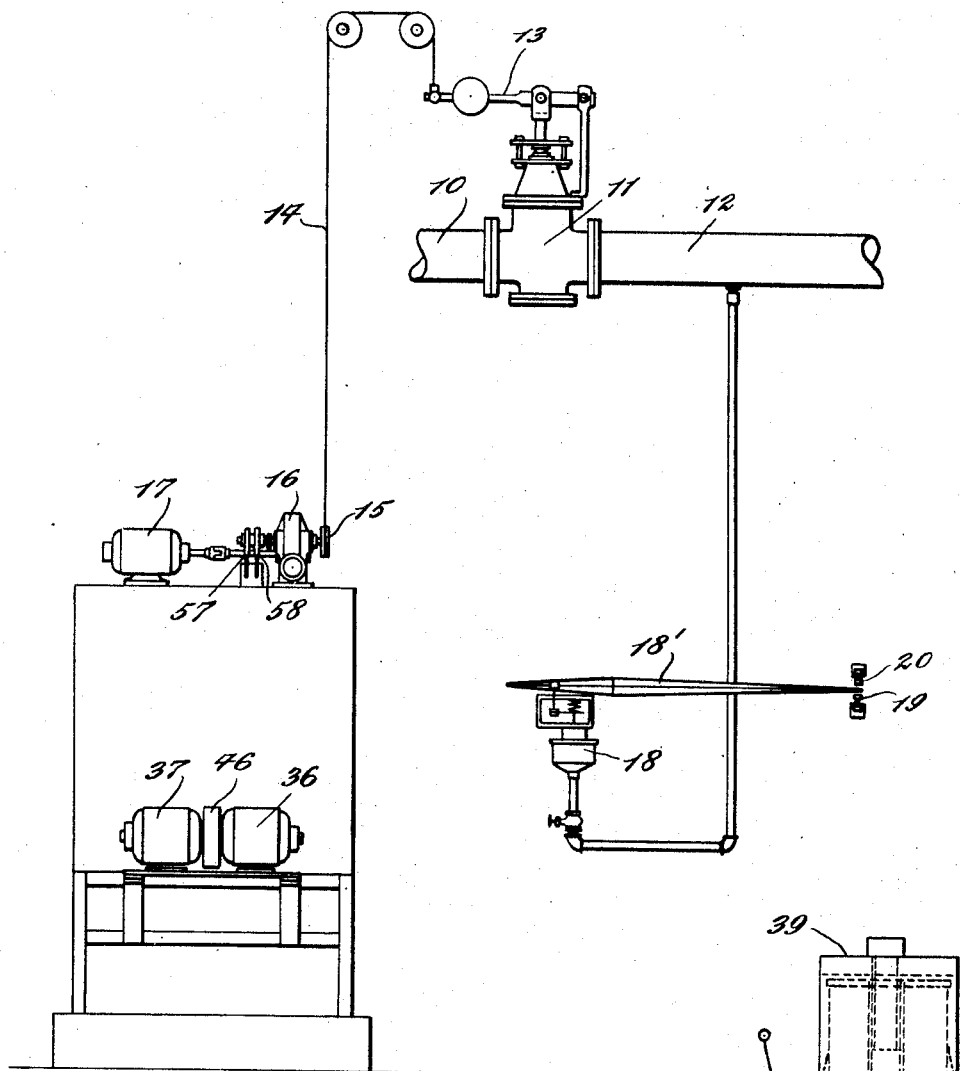
Figure 2:
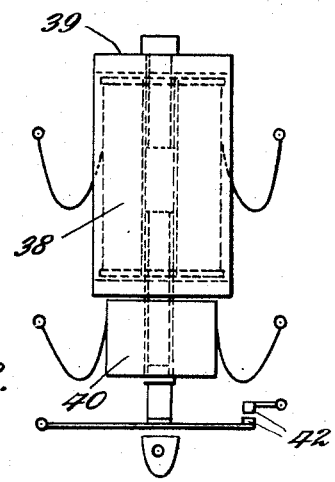
Figure 3:
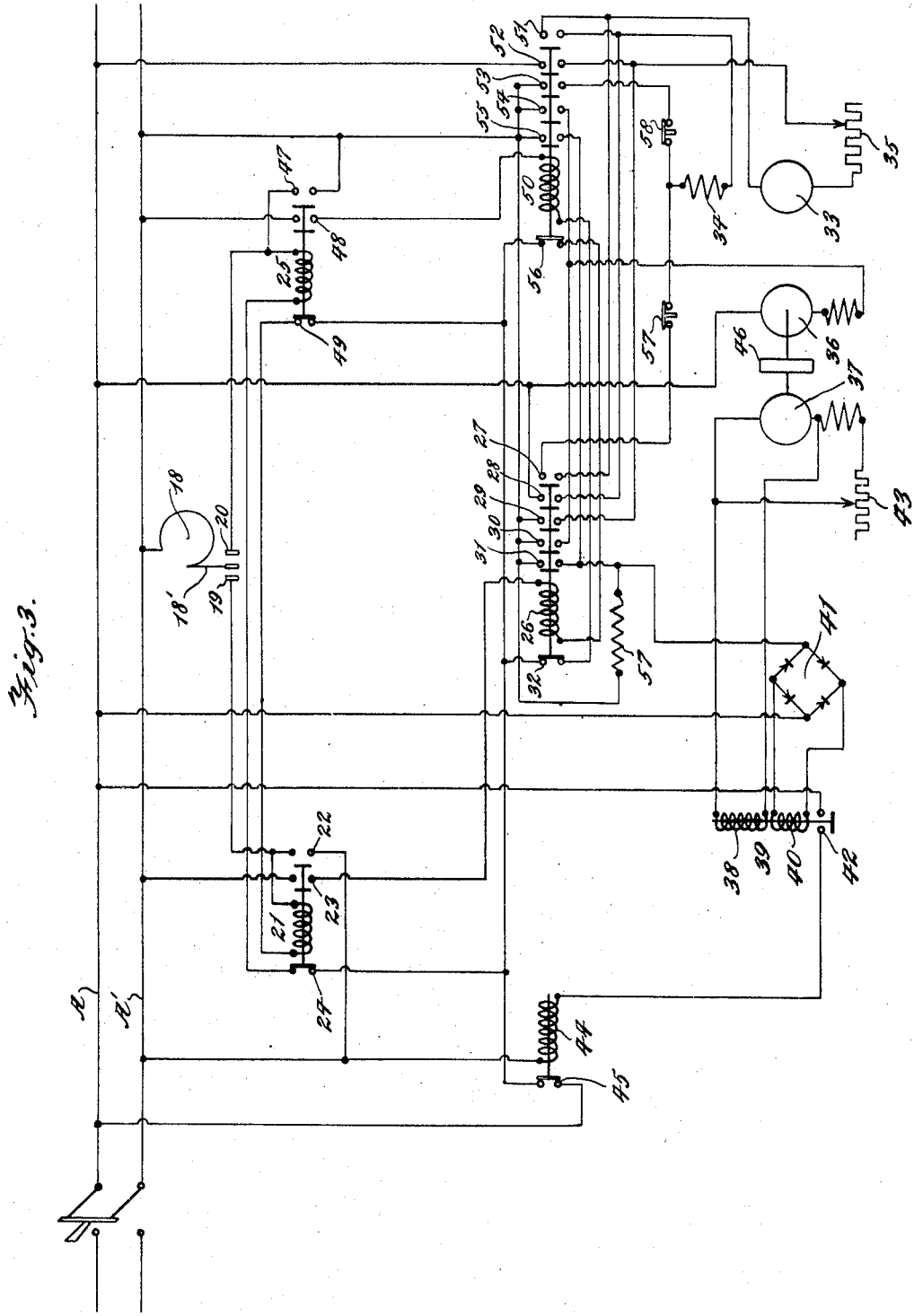

The objects, features and advantages of my invention will appear from the following description and accompanying drawings in which Fig. 1 illustrates apparatus used in carrying out my invention;

Fig. 2 illustrates a type of polarized relay which may be used in carrying out my invention; and Fig. 3 is a diagrammatic drawing of the electric circuit for carrying out my invention.

When a fluid, for instance such as steam, is supplied at high pressure, it is desirable to reduce the pressure to a pressure most advantageous for the use to which the steam is to be put. For example, it is desirable in using steam for heating purposes to reduce the pressure to atmospheric pressure when it is passed into the heating system. Circulation under such a condition is obtained by having the system under a vacuum.

In my apparatus I have included means so that the time during which adjustment of the supply of steam is effected may be regulated in accordance with particular conditions in order to be utilized most advantageously.

For instance, in supplying steam at reduced pressure to a heating system, I have found that greater economy results if the change in the supply is made in a series of small steps with a short waiting period between each step. Such an arrangement permits varying conditions in the demand during the adjustment to equalize themselves and prevents overshooting the heating requirements. However, where the adjustment is made in this manner, there may be slight variations in pressure from the desired pressure during such adjustment.

Under certain conditions as where there is a large continuous demand at constant pressure even slight variations in pressure may be undesirable and in that event the system will be set to give substantially continuous regulation thereby maintaining a constant pressure.

Refering to the drawings in detail, there is a high pressure supply pipe 10 through which steam at high pressure is supplied to a pressure reducing valve 11 and then to a distribution pipe 12 which leads to a heating system. The pressure reducing valve 11 is adjustable to control the amount of steam supplied in accordance with the demand.

The adjustment of the pressure reducing valve 11 is accomplished by moving a counter-weighted valve operating lever 13 by means of a cable 14 which is connected to a drum 15. The drum 15 is driven through reducing gears 16 by an electric motor 17 which can be caused to operate in either direction to effect the adjustment of the pressure reducing valve 11.

The electric motor 17 is operated in response to changes in pressure in the distribution pipe 12. These changes in pressure are transmitted to a pressure gage 18 which is arranged to open or close either contacts 19 or 20 at predetermined pressures.

When the pressure in the distribution pipe falls below a predetermined value, the pressure gage 18 will cause a contact carrying arm 18' to come into contact with contact 19 thereby completing a circuit connecting a pilot relay 21 to line wires A and A1 which are connected to a suitable source of electrical energy. This causes the pilot relay 21 to operate closing contacts 22 and 23 and opening contacts 24.

The closing of contacts 22 completes a holding circuit which parallels the circuit completed by the closing of contact 19 connecting the pilot relay 21 to the line wires A and A1. This holding circuit maintains the relay 21 in operation independently of the connection between the arm 18' and the contact 19 which may open due to changes in the pressure before the cycle of operation for the rest of the system has been completed.

The opening of contacts 24 interrupts a circuit connecting a second pilot relay 25 to the line wire A and thus prevents that pilot relay from operating in the event that the variations in pressure are of sufficient magnitude to cause the contact carrying arm 18' to come into contact with contact 20 before the operating cycle of the system has been completed.

The closing of contacts 23 completes a circuit from the line wires A and A1 to a motor reversing relay 26 causing that relay to operate. When the motor reversing relay 26 operates, it closes contacts 27, 28, 29, 30 and 31 and opens contacts 32. The opening of contacts 32 interrupts a circuit connecting a second motor reversing relay 50 to the line wire A and thus prevents the operation of that relay while these contacts are open.

The closing of contacts 27, 28 and 29 completes a circuit from the line wires A and A1 to the armature 33 and the field coil 34 of the valve adjusting motor 17 so that the motor will rotate in a direction which will cause the pressure reducing valve 11 to be opened. The speed at which the valve adjusting motor 17 operates may be regulated by adjusting a variable resistance 35 in its armature circuit thus permitting the rate at which the valve 11 is adjusted to be controlled within certain limits.

The time that the valve operating motor 17 remains in operation is controlled by a timing mechanism which is the subject of my co-pending application Serial Number 419,737, now Patent No. 2,298,687, of October 13, 1942. This timing mechanism is placed in operation by the closing of the contacts 30 by the motor reversing relay 26 which completes a circuit connecting a motor 36 of a motor generator set to the line wires A and A1. This starts the motor 36 which drives a generator 37, the output of which is connected to a coil 38 of a solenoid operated polarized relay 39.

The effect of the coil 38 is opposed by another coil 40 of the polarized relay 39. This coil 40 is connected through a rectifier 41 to the line wires A and A1 by the closing of contacts 31 by the motor reversing relay 26. When sufficient energy has been built up in the coil 38 by the generator 37 to overcome the effect of the opposing coil 40, the polarized relay 39 will operate to close contacts 42.

In addition to the coil 38 a load in the form of a variable resistance 43 is connected across the output of the generator 37 for purposes to be described later.

The closing of the contacts 42 by the polarized relay 39 completes a circuit connecting a relay 44 with the line wires A and A1 thereby causing that relay to operate, opening contacts 45. The opening of contacts 45 by the relay 44 interrupts the circuit conecting the pilot relay 21 to the line wire A and the circuit connecting the motor reversing relay 26 to the line wire A. When the circuit to the pilot relay 21 is interrupted, that relay opens contacts 23 and 22 and closes contacts 24. And when the circuit to the motor reversing relay 26 is opened, that relay operates to open contacts 27, 28, 29, 30 and 31 and to close contacts 32. When contacts 27, 28 and 29 are opened, the circuit connecting the valve adjusting motor 17 to the line wires A and A1 is interrupted and that motor ceases operation.

The opening of the contacts 30 and 31 interrupts the circuit from the line wires A and A1 to the motor 36 of the motor generator set and to the coil 40 of the polarized relay 39, respectively. After the motor 36 of the motor generator set is disconnected from the line wires A and A1 the operation of the generator 37 is prolonged by the inertia stored in a flywheel 46 which is carried on and rotates with a shaft connecting the motor 36 and the generator 37. Thus the generator will continue to supply energy to the coil 38 of the polarized relay 39 after the motor 37 has been disconnected and since the opposing coil 40 of the polarized relay 39 is also disconnected, the effect of the coil 38 will keep the contacts 42 closed until the generator 37 has practically come to rest.

In order to overcome the effect of residual magnetism produced by the coil 38 in connection with the operation of the polarized relay 39 after the generator 37 comes to rest, a resistance 57 is connected from one side of the rectifier 41 to the line wire A1, the other side of the rectifier being connected to the line wire A. This resistance 57 permits a small amount of current to flow through the rectifier 41 to the opposing coil 40 of the polarized relay 39 at all times.

The time during which the generator 37 will continue to operate to supply electrical energy to the coil 38 of the polarized relay 39 may be regulated by adjusting the variable resistance 43. The variable resistance 43 acts as a brake on the generator 37 so that if it is high the generator stops quickly and if it is low the generator operates longer.

As long as the coil 38 of the polarized relay 39 holds the contacts 42 closed the contacts 45 of the relay 44 in the circuit connecting the pilot relays 21 and 25 to the line wire A are held open. This prevents the pilot relays from operating and thereby prevents the operation of the valve adjusting motor 17.

This delay constitutes a waiting period which may be regulated to produce the most advantageous results under given conditions. In supplying steam to a heating system I have found a period of 30 to 60 seconds to be satisfactory although this may vary with variations in the characteristics of the heating system itself.

When the electrical energy being supplied to the coil 38 of the polarized relay 39 falls below a certain point, the contacts 42 open interrupting the circuit connecting the relay 44 to the line wires A and A1. When this occurs, the contacts 45 are closed reestablishing the circuit from the pilot relays 21 and 25 to the line wire A thus placing the system in condition to repeat its operation if the demand has not been supplied or to reverse its operation when the supply exceeds the demand.

When the supply exceeds the demand, the pressure in the distribution system will be greater than required and the contact carrying arm 18' will move to connect the line wire A1 to the contact 20. When this occurs, the operation of the system is exactly the same as has been described with the exception that the direction in which the valve adjusting motor 17 rotates is reversed so that the pressure reducing valve 11 will be closed instead of being opened. For this purpose when the contact carrying arm 18' contacts with contact 20, a circuit is completed connecting the second pilot relay 25 to the line wires A and A1. This causes the second pilot relay 25 to operate closing contacts 47 and 48 and opening contacts 49. The closing of contacts 47 completes a holding circuit for the pilot relay 25 and the closing of contacts 48 completes a circuit from the line wires A and A1 to a second motor reversing relay 50 causing the operation of that relay to close contacts 51, 52, 53, 54 and 55 and to open contacts 56. The opening of contacts 49 by the pilot relay 25 interrupts the circuit to the other pilot relay and prevents its operation while these contacts 49 remain open. The opening of contacts 56 interrupts the circuit from the first motor reversing relay 26 to the line wire A and thus prevents operation of that relay while these contacts remain open.

The closing of contacts 51, 52 and 53 connect the valve adjusting motor 17 to the line wires A and A1 so that the motor 17 will now operate in a direction to cause the pressure reducing valve 11 to be closed. The closing of contacts 54 connects the motor 36 of the motor generator set to the line wires A and A1 and the closing of the contacts 55 connects the rectifier 41 to the line wires A and A1. The subsequent operation of these devices is the same as that which has already been described in conjunction with their operation in conjunction with the operation of the motor reversing relay 26.

In order to prevent over-travel of the valve adjusting motor 17, there are limit switches 57 and 58 arranged to interrupt the circuit from this valve adjusting motor to the line wires A and A1 if the motor reaches an extreme open or closed position of the pressure reducing valve 11. These limit switches are associated with and operated by the drum 15 and the reducing gears 16 which are driven by the valve adjusting motor 17.

While I have shown and described the invention as embodied in a specific form, it is understood that various changes in details may be made without departing from the scope of the invention as defined by the appended claims.

I claim:

1. In a system for electrically controlling an adjustable pressure reducing valve in response to variations from a fixed pressure in a fluid distribution system, a reversible valve adjusting motor, a pair of motor controlling relays, each of said motor controlling relays respectively being arranged to connect said valve adjusting motor in circuit for rotation in opposite directions, an electrical timing device controlled by the operation of said relays, and means controlled by said timing device for interrupting the circuits to said relays after a predetermined period of time and to maintain such condition for another predetermined period of time thereby causing the valve adjusting motor to remain inoperative for a predetermined period after each period of operation.

2. In a system for electrically controlling an adjustable pressure reducing valve in response to variations from a fixed pressure in a fluid distribution system, a pressure responsive circuit closing device connected with said distribution system, a motor reversing relay, circuits controlled by said pressure responsive circuit closing device for operating said motor reversing relay, a reversible valve adjusting motor, circuits controlled by said motor reversing relay for operating the valve adjusting motor, an electrical timing device, circuits controlled by the motor reversing relay to place said timing device in operation when the valve adjusting motor is operated, and means controlled by the timing device to interrupt the circuits to the valve adjusting motor after a predetermined period of operation and to maintain such condition for another predetermined period.

3. In a system for electrically controlling an adjustable pressure reducing valve in response to variations from a fixed pressure in a fluid distribution system, a pressure responsive circuit closing device, a pair of motor control relays, circuits controlled by the pressure responsive device operating said motor control relays, one of said circuits being completed in response to a decrease from the fixed pressure and the other in response to an increase from said pressure, a reversible valve adjusting motor, circuits controlled by the motor control relays operating the valve adjusting motor, each of said relays connecting said motor for operation in an appropriate direction in accordance with the pressure condition in the distribution system, an electrical timing device, circuits controlled by the relays operating said timing device in conjunction with the valve adjusting motor and means controlled by the timing device to interrupt the operation of the valve adjusting motor after a predetermined period of time and to maintain such condition for another predetermined period of time.

4. In a system for electrically controlling an adjustable pressure regulating valve in response to variations from a fixed pressure in a fluid distribution system, a pressure responsive device, a pair of motor control relays, means controlled by said pressure responsive device acting in response to a decrease in pressure to connect one of said relays to a source of electrical energy and means controlled by said pressure responsive device acting in response to an increase in pressure to connect the other of said relays to the source of electrical energy, a reversible valve adjusting motor, circuits connecting said motor to the source of electrical energy, the circuits for operating the motor in one direction being controlled by one of said relays and the circuits for operating the motor in the opposite direction being controlled by the other relay, an electrical timing device, circuits controlled by the relays connecting said timing device to the source of electrical energy, and means controlled by the timing device to interrupt the circuits to the relays after a predetermined period of time and to maintain said interruption for another predetermined period of time.

5. A system for electrically controlling an adjustable pressure regulating valve in response to variations from a fixed pressure in a fluid distribution system comprising a pressure responsive circuit closing device connected to said distribution system, a pair of pilot relays, circuits connecting said relays to a source of electrical energy, said circuits being controlled by the pressure responsive circuit closing device, one of said circuits being completed in response to a decrease from the fixed pressure and the other in response to an increase from said pressure, a pair of motor control relays, circuits connecting said motor control relays to a source of electrical energy, each of said circuits being controlled respectively by one of the pilot relays, a reversible valve adjusting motor, circuits connecting said motor to a source of electrical energy, the circuits for operating the motor in one direction being controlled by one of the motor control relays and the circuits for operating the motor in an opposite direction being controlled by the other motor control relay, an electrical timing device, circuits controlled by said motor control relays connecting said timing device to the source of electrical energy, and means controlled by said timing device to interrupt after a predetermined period of time the circuits to the motor control relays and to maintain such condition for a second predetermined period of time thereby causing the valve adjusting motor to be inoperative for a certain time after each period of operation.

6. A system for electrically controlling an adjustable pressure regulating valve in response to variations from a fixed pressure in a fluid distribution system comprising a pressure responsive circuit closing device connected to said distribution system, a pair of pilot relays, circuits connecting said relays to a source of electrical energy, said circuits being controlled by the pressure responsive circuit closing device, one of said circuits being completed in response to a decrease from the fixed pressure and the other in response to an increase from said pressure, a holding circuit associated with each of said relays, said holding circuits being completed by the operation of the relays and connecting the relays to a source of electrical energy independently of the pressure responsive closing device, a pair of motor control relays, circuits connecting said motor control relays to a source of electrical energy, each of said circuits being controlled respectively by one of the pilot relays, a reversible valve adjusting motor, circuits connecting said motor to a source of electrical energy, the circuits for operating the motor in one direction being controlled by one of the motor control relays and the circuits for operating the motor in the opposite direction being controlled by the other motor control relay, an electrical timing device, circuits controlled by said motor control relays connecting said timing device to the source of electrical energy, and means controlled by said timing device to interrupt after a predetermined period of time the circuits to the motor control relays and the pilot relay holding circuits and to maintain such condition for a second predetermined period of time thereby causing the valve adjusting motor to be inoperative for a certain time after each period of operation.

7. In a system for electrically controlling an adjustable pressure regulating valve in response to variations from a fixed pressure in a fluid distribution system, a pressure responsive circuit closing device connected to said distribution system, a pilot relay, a circuit controlled by the pressure responsive device connecting said relay to a source of electrical energy, said circuit being completed by said pressure responsive device in response to a given variation from the fixed pressure in said distribution system, a motor control relay, a circuit controlled by said pilot relay connecting said motor control relay to a source of electrical energy, a valve adjusting motor, circuits controlled by said motor control relay connecting the valve adjusting motor to a source of electrical energy, an electrical timing device, circuits controlled by said motor control relay connecting the timing device to a source of electrical energy, and means controlled by said timing device to interrupt the circuit to the motor control relay after a predetermined period of time and to maintain such condition for a second predetermined period of time thereby causing the valve adjusting motor to be inoperative for a certain fixed time after each period of operation.

8. In a system for electrically controlling an adjustable pressure regulating valve in response to variations from a fixed pressure in a fluid distribution system, a pressure responsive circuit closing device connected to said distribution system, a pilot relay, a circuit controlled by the pressure responsive device connecting said relay to a source of electrical energy, said circuit being completed by said pressure responsive device in response to a given variation from the fixed pressure in said distribution system, a holding circuit connecting said pilot relay to a source of electrical energy, independently of said pressure responsive device, said holding circuit being completed by the operation of the pilot relay, a motor control relay, a circuit controlled by said pilot relay connecting said motor control relay to a source of electrical energy, a valve adjusting motor, circuits controlled by said motor control relay connecting the valve adjusting motor to a source of electrical energy, an electrical timing device, circuits controlled by said motor control relay connecting the timing device to a source of electrical energy, and means controlled by said timing device to interrupt the circuit to the motor control relay and the holding circuit after a predetermined period of time and to maintain such condition for a second predetermined period of time thereby causing the valve adjusting motor to be inoperative for a certain fixed time after each period of operation.

PETER J. DUGAN.